United States Patent
Shpunt et al.

(10) Patent No.: US 10,291,905 B2
(45) Date of Patent: *May 14, 2019

(54) NON-UNIFORM SPATIAL RESOURCE ALLOCATION FOR DEPTH MAPPING

(71) Applicant: Apple Inc., Cupertino, CA (US)

(72) Inventors: Alexander Shpunt, Tel Aviv (IL); Zafrir Mor, Ein Habsor (IL)

(73) Assignee: APPLE INC., Cupertino, CA (US)

( * ) Notice: Subject to any disclaimer, the term of this patent is extended or adjusted under 35 U.S.C. 154(b) by 352 days.

This patent is subject to a terminal disclaimer.

(21) Appl. No.: 14/613,465

(22) Filed: Feb. 4, 2015

(65) Prior Publication Data

US 2015/0145961 A1 May 28, 2015

Related U.S. Application Data

(63) Continuation of application No. 13/036,023, filed on Feb. 28, 2011, now Pat. No. 8,982,182.

(Continued)

(51) Int. Cl.
| | |
|---|---|
| *H04N 13/00* | (2018.01) |
| *G06T 7/00* | (2017.01) |
| *H04N 13/254* | (2018.01) |
| *H04N 13/271* | (2018.01) |
| *G06F 3/00* | (2006.01) |

(Continued)

(52) U.S. Cl.
CPC ........... *H04N 13/254* (2018.05); *G06F 3/005* (2013.01); *G06F 3/011* (2013.01); *G06T 7/521* (2017.01); *H04N 13/271* (2018.05); *G06T 2207/10016* (2013.01); *G06T 2207/30196* (2013.01)

(58) Field of Classification Search
CPC ......... G06T 7/0057; G06T 2207/10016; G06T 2200/28; G06T 2207/30201; G06T 2207/10004; G06T 2207/20076; G06T 2207/30241; G06T 7/0042; G06T 2207/10152; G06T 2207/30076; G06T 2207/10012; G06T 7/0022; G06T 7/0075; G06T 7/0083; G06T 9/001; G06T 7/521; G06T 2207/30196; G01B 11/2527; G01B 11/00; G01B 11/2513; H04N 13/0253; H04N 13/0271; H04N 13/02; A61B 6/032; A61B 6/06; A61B 6/025; A61B 6/4085;

(Continued)

(56) References Cited

U.S. PATENT DOCUMENTS

| 6,081,577 A * | 6/2000 | Webber ................ G01N 23/046 378/23 |
| 6,549,607 B1 * | 4/2003 | Webber ................ G01N 23/046 378/21 |

(Continued)

*Primary Examiner* — Tsion B Owens
*Assistant Examiner* — Kehinde Abimbola
(74) *Attorney, Agent, or Firm* — Kligler & Associates

(57) ABSTRACT

A method for depth mapping includes providing depth mapping resources, including a radiation source, which projects optical radiation into a volume of interest containing an object, and a sensor, which senses the optical radiation reflected from the object. The volume of interest has a depth that varies with angle relative to the radiation source and the sensor. A depth map of the object is generated using the resources while applying at least one of the resources non-uniformly over the volume of interest, responsively to the varying depth as a function of the angle.

20 Claims, 3 Drawing Sheets

Related U.S. Application Data

(60) Provisional application No. 61/309,000, filed on Mar. 1, 2010.

(51) Int. Cl.
*G06F 3/01* (2006.01)
*G06T 7/521* (2017.01)

(58) Field of Classification Search
CPC ..... A61B 6/4441; A61B 6/5205; A61B 6/037; A61B 6/469
See application file for complete search history.

(56) References Cited

U.S. PATENT DOCUMENTS

| | | | | |
|---|---|---|---|---|
| 6,801,597 B2* | 10/2004 | Webber | G01N 23/046 | 378/23 |
| 6,990,169 B2* | 1/2006 | Claus | A61B 6/00 | 378/4 |
| 7,250,949 B2* | 7/2007 | Claus | G06T 15/06 | 345/424 |
| 8,050,461 B2* | 11/2011 | Shpunt | G01B 11/2513 | 356/610 |
| 8,150,142 B2* | 4/2012 | Freedman | G01B 11/2513 | 345/419 |
| 8,368,696 B2* | 2/2013 | Daly | H04N 13/021 | 345/427 |
| 8,400,494 B2* | 3/2013 | Zalevsky | G01B 11/162 | 348/46 |
| 8,456,517 B2* | 6/2013 | Spektor | G06K 9/00355 | 348/43 |
| 8,494,252 B2* | 7/2013 | Freedman | G06T 7/521 | 382/154 |
| 8,848,039 B2* | 9/2014 | Spektor | G06K 9/00355 | 348/43 |
| 9,066,084 B2* | 6/2015 | Zalevsky | G01B 11/162 | |
| 2004/0008809 A1* | 1/2004 | Webber | G01N 23/046 | 378/8 |
| 2004/0054248 A1* | 3/2004 | Kimchy | A61B 5/055 | 600/3 |
| 2004/0175962 A1* | 9/2004 | Shu | G03B 27/62 | 430/5 |
| 2005/0059886 A1* | 3/2005 | Webber | G01N 23/046 | 600/426 |
| 2005/0134582 A1* | 6/2005 | Claus | G06T 15/06 | 345/419 |
| 2005/0135557 A1* | 6/2005 | Claus | A61B 6/00 | 378/21 |
| 2008/0106746 A1* | 5/2008 | Shpunt | G01B 11/2513 | 356/610 |
| 2008/0123813 A1* | 5/2008 | Maurer | A61N 5/103 | 378/96 |
| 2008/0231835 A1* | 9/2008 | Iizuka | G01S 17/08 | 356/72 |
| 2008/0240502 A1* | 10/2008 | Freedman | G01B 11/2513 | 382/103 |
| 2008/0285715 A1* | 11/2008 | Shedlock | G01N 23/203 | 378/87 |
| 2009/0096783 A1* | 4/2009 | Shpunt | G01B 11/25 | 345/419 |
| 2009/0185274 A1* | 7/2009 | Shpunt | G02B 27/0944 | 359/558 |
| 2010/0007717 A1* | 1/2010 | Spektor | G06K 9/00355 | 348/43 |
| 2010/0118123 A1* | 5/2010 | Freedman | G01B 11/25 | 348/46 |
| 2010/0177164 A1* | 7/2010 | Zalevsky | G01B 11/162 | 348/46 |
| 2010/0284082 A1* | 11/2010 | Shpunt | G01B 11/25 | 359/558 |
| 2010/0290698 A1* | 11/2010 | Freedman | G06K 9/3241 | 382/154 |
| 2010/0321388 A1* | 12/2010 | Daly | H04N 13/021 | 345/427 |
| 2011/0118985 A1* | 5/2011 | Aarre | G01V 1/301 | 702/16 |
| 2011/0211044 A1* | 9/2011 | Shpunt | G06F 3/005 | 348/46 |
| 2013/0136305 A1* | 5/2013 | Shpunt | G01B 11/25 | 382/103 |
| 2013/0155195 A1* | 6/2013 | Zalevsky | G01B 11/162 | 348/46 |
| 2013/0241824 A1* | 9/2013 | Spektor | G06K 9/00355 | 345/156 |
| 2015/0009133 A1* | 1/2015 | Spektor | G06K 9/00355 | 345/156 |
| 2015/0116460 A1 | 4/2015 | Jouet et al. | | |

* cited by examiner

NON-UNIFORM SPATIAL RESOURCE ALLOCATION FOR DEPTH MAPPING

CROSS-REFERENCE TO RELATED APPLICATION

This application is a continuation of U.S. patent application Ser. No. 13/036,023, filed Feb. 28, 2011, which claims the benefit of U.S. Provisional Patent Application 61/309,000, filed Mar. 1, 2010, which is incorporated herein by reference.

FIELD OF THE INVENTION

The present invention relates generally to methods and systems for depth mapping, and specifically to optimizing the design and performance of a depth mapping system.

BACKGROUND OF THE INVENTION

A number of different methods and systems are known in the art for creating depth maps. In the present patent application and in the claims, the terms "depth map" and "3D map" are used interchangeably to refer to a representation of a scene as a two-dimensional matrix of pixels, in which each pixel corresponds to a respective location in the scene and has a respective pixel value indicative of the distance from a certain reference location to respective scene location. In other words, the depth map has the form of an image in which the pixel values indicate topographical information, rather than brightness and/or color of the objects in the scene.

Depth maps may be created, for example, by detection and processing of an image of an object onto which a pattern is projected, such as a laser speckle pattern as described in PCT International Publication WO 2007/043036 A1, whose disclosure is incorporated herein by reference. As another example, U.S. Patent Application Publication 2008/0240502, whose disclosure is incorporated herein by reference, describes apparatus for mapping an object using an illumination assembly, which includes a transparency containing a fixed pattern of spots and projects the pattern onto an object. An image capture assembly captures an image of the pattern that is projected onto the object. A processor processes the image captured by the image capture assembly so as to reconstruct a 3D map of the object.

SUMMARY

Depth mapping systems in practice (in common with imaging systems generally) have limited resources, in terms of light intensity, optical resolution and computing power, for example. Embodiments of the present invention that are described hereinbelow provide techniques that may be used to optimally allocate these resources in order to improve overall system performance.

There is therefore provided, in accordance with an embodiment of the present invention, a method for depth mapping, which includes providing depth mapping resources including an illumination module, which is configured to project patterned optical radiation into a volume of interest containing the object, and an image capture module, which is configured to capture an image of the pattern reflected from the object. A depth map of the object is generated using the resources while applying at least one of the resources non-uniformly over the volume of interest.

In some embodiments, the volume of interest has a depth that varies with angle relative to the illumination and image capture modules, and applying the at least one of the resources non-uniformly includes varying an application of the at least one of the resources responsively to the varying depth as a function of the angle. In a disclosed embodiment, the volume of interest has a pentagonal profile, with a vertex at the image capture module. Varying the application of the at least one of the resources non-uniformly may include angularly modulating an intensity distribution of the patterned optical radiation projected by the illumination module. Additionally or alternatively, varying the application of the at least one of the resources non-uniformly may include optically distorting the image captured by the image capture module.

In disclosed embodiments, the illumination module is configured to project a spatial pattern of the optical radiation onto the object, and generating the depth map includes deriving depth coordinates of the object based on transverse shifts of the spatial pattern in the image.

There is also provided, in accordance with an embodiment of the present invention, apparatus for depth mapping, which includes depth mapping resources including an illumination module, which is configured to project patterned optical radiation into a volume of interest containing the object, and an image capture module, which is configured to capture an image of the pattern reflected from the object. At least one of the resources is applied non-uniformly over the volume of interest. A processor is configured to process the image in order to generate a depth map of the object.

There is additionally provided, in accordance with an embodiment of the present invention, apparatus for depth mapping, including an illumination module, which is configured to project patterned optical radiation, with a given pattern distortion, into a volume of interest containing an object. An image capture module includes an image sensor and objective optics configured to form an image of the pattern on an image sensor while applying an optical distortion to the image that compensates at least partially for the pattern distortion. A processor is configured to process the image in order to generate a depth map of the object.

In a disclosed embodiment, the objective optics include an F-theta lens, and the illumination module includes a diffractive optical element (DOE) and a radiation emitter configured to transilluminate the DOE so as to generate the patterned optical radiation.

The present invention will be more fully understood from the following detailed description of the embodiments thereof, taken together with the drawings in which:

DETAILED DESCRIPTION OF EMBODIMENTS

In creating a depth mapping system, the designer typically attempts to optimize the 3D resolution of the system, including both the effective number of pixels in the map and the number of depth gradations. The resolution is limited, however, by the available resources, including the resolution and signal/noise ratio of the image capture module and, in active depth mapping systems, the power and pattern definition of the illumination module. (The term "active" is used in the context of the present patent application to refer to depth mapping techniques in which a pattern of optical radiation is projected onto an object and an image of the patterned radiation reflected from the object is captured by an imaging device. The pattern may be a spatial pattern, as in patterned illumination imaging systems, or a temporal pattern, as in time-of-flight imaging systems, or it may contain a combination of spatial and temporal patterns.)

Embodiments of the present invention that are described hereinbelow provide methods that may be used to optimize the performance of a depth mapping system by applying the resources of the system non-uniformly over the volume of interest that is mapped by the system. Some of these embodiments are based on the realization that the depth of the volume of interest varies with angle relative to the illumination and image capture modules. Thus, system performance may be optimized, relative to the available resources, by varying aspects of the illumination pattern or the optical resolution, or both, as a function of the angle, responsively to the varying depth.

Figure 1:
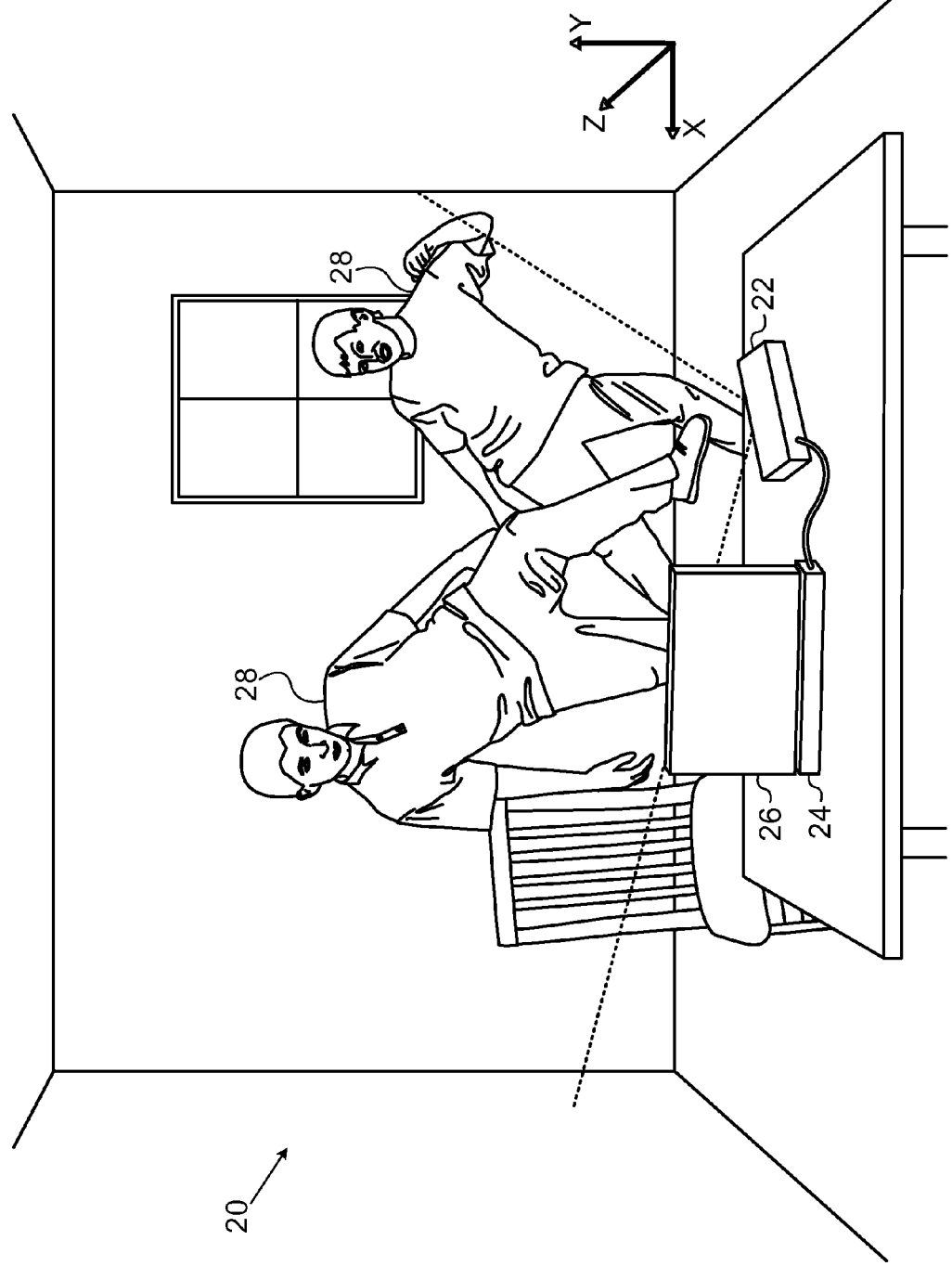
FIG. 1 is a schematic, pictorial illustration of a depth mapping system, in accordance with an embodiment of the present invention.

FIG. 1 is a schematic, pictorial illustration of a depth mapping system 20, in accordance with an embodiment of the present invention. The system is based on a 3D imaging assembly 22, which captures 3D scene information in a volume of interest (VOI) that includes one or more objects. In this example, the objects comprise at least a part of the bodies of users 28. Assembly 22 outputs a sequence of frames containing depth data to a computer 24, which processes and extracts high-level information from the map data. This high-level information may be provided, for example, to an application running on computer 24, which drives a display screen 26 accordingly.

Computer 24 processes data generated by assembly 22 in order to reconstruct a depth map of the VOI containing users 28. In one embodiment, assembly 22 projects a pattern of spots onto the scene and captures an image of the projected pattern. Assembly 22 or computer 24 then computes the 3D coordinates of points in the scene (including points on the surface of the users' bodies) by triangulation, based on transverse shifts of the spots in the captured image relative to a reference image. This approach is advantageous in that it does not require the user to hold or wear any sort of beacon, sensor, or other marker. It gives the depth coordinates of points in the scene relative to a predetermined reference plane, at a certain distance from assembly 22. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, system 20 may use other methods of 3D mapping, based on single or multiple cameras or other types of sensors, such as time-of-flight cameras, as are known in the art.

Although computer 24 is shown in FIG. 1, by way of example, as a separate unit from imaging assembly 22, some or all of the processing functions of the computer may be performed by a suitable microprocessor and software or by dedicated circuitry within the housing of the imaging assembly or otherwise associated with the imaging assembly. As another alternative, at least some of these processing functions may be carried out by a suitable processor that is integrated with display screen 26 (in a television set, for example) or with any other suitable sort of computerized device, such as a game console or media player. The sensing functions of assembly 22 may likewise be integrated into computer 24 or other computerized apparatus that is to be controlled by the sensor output.

For simplicity and clarity in the description that follows, a set of Cartesian axes is marked in FIG. 1. The Z-axis is taken to be the optical axis of imaging assembly 22 (and specifically of an image capture module in the assembly, as described below). The frontal plane of the imaging assembly is taken to be the X-Y plane, with the X-axis as the horizontal and the origin at the entrance pupil of the image capture module. These axes, however, are defined solely for the sake of convenience. Other geometrical configurations of the imaging assembly and its volume of interest may alternatively be used and are considered to be within the scope of the present invention.

Figure 2:
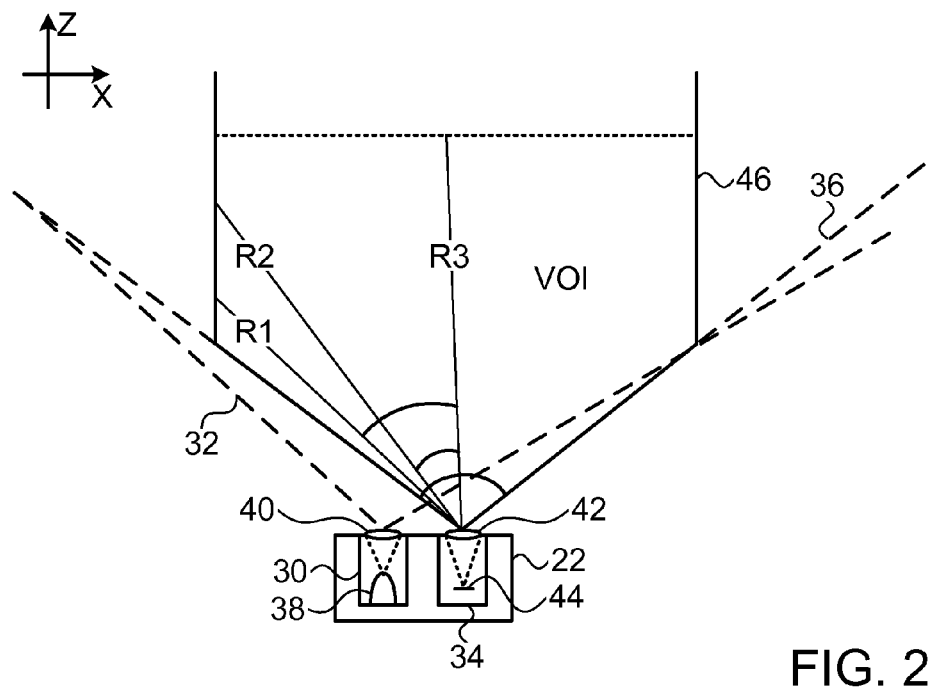
FIG. 2 is a schematic top view of a 3D imaging assembly and its volume of interest, in accordance with an embodiment of the present invention.

FIG. 2 is a schematic top view of imaging assembly 22 and its volume of interest (VOI) 46, in accordance with an embodiment of the present invention. Imaging assembly 22 comprises an illumination module 30, which projects a pattern over a projection field 32, which contains effectively all of VOI 46. The illumination module in this example comprises a radiation source 38, which generates patterned optical radiation, and projection optics 40, which project the pattern onto objects in VOI 46. The optical radiation may comprise visible, infrared or ultraviolet radiation. Radiation source 38 may comprise, for example, a laser diode or light-emitting diode coupled to transilluminate a suitable, diffuser, microlens array, diffractive optical element, or other transparency, as described in the above-mentioned PCT publications or as otherwise known in the art.

A depth imaging module 34 in assembly 22 captures images of the pattern reflected from the objects in VOI 46. Typically, the imaging module comprises objective optics 42, which focus light from a field of view (FOV) 36 onto an image sensor 44. The image sensor may comprise, for example, a CMOS or CCD sensor, comprising an array of detector elements (not shown) that are sensitive to the optical radiation emitted by illumination module 30. Each of the detector elements outputs a signal corresponding to a pixel in the images of VOI 46.

A processor, such as a microprocessor in assembly 22 (not shown) or in computer 24, receives the images from module 34 and compares the pattern in each image to a reference pattern stored in memory. The processor computes local shifts of parts of the pattern in the images captured by module 34 relative to the reference pattern and translates these shifts into depth coordinates. Details of this process are described, for example, in PCT International Publication WO 2010/004542, whose disclosure is incorporated herein by reference. Alternatively, as noted earlier, assembly 22 may be configured to generate depth maps by other means that are known in the art, such as stereoscopic imaging or time-of-flight measurements.

Comparing FIGS. 1 and 2, it can be seen that VOI 46 in this and various other sorts of 3D user interface applications has a pentagonal profile when projected onto the X-Z plane, with image capture module 34 at its vertex. Although VOI 46 is congruent with FOV 36 in the near field, at greater depths the VOI is limited by the walls of the room or other space in which system 20 is deployed. The distance to the back wall in this example is marked in FIG. 2 as R3. Alternatively, R3 may be defined as the maximum design range (in terms of the Z-coordinate) of objects to be detected by system 20. Over a certain range of angles within VOI 46, this maximum range is maintained, up to roughly the angle corresponding to R2 (while the radial distance to points at the end of the range may actually increase moving away from the central axis). At larger angles, however, the range becomes smaller, as illustrated by R1, for example. This specific, simplified geometry is shown in FIG. 2 by way of example, but other operating configurations are expected to have similar, roughly pentagonal volumes of interest, although the angles and dimensions may differ.

The characteristic shape and dimensions of VOI 46 may be applied in optimizing the allocation of the resources of imaging assembly 22 over the VOI. Specifically, resources such as the available optical power of radiation source 38 and/or the available resolution of image sensor 44 may be allocated non-uniformly over the VOI. A number of examples of such allocations are described below.

Figure 3:
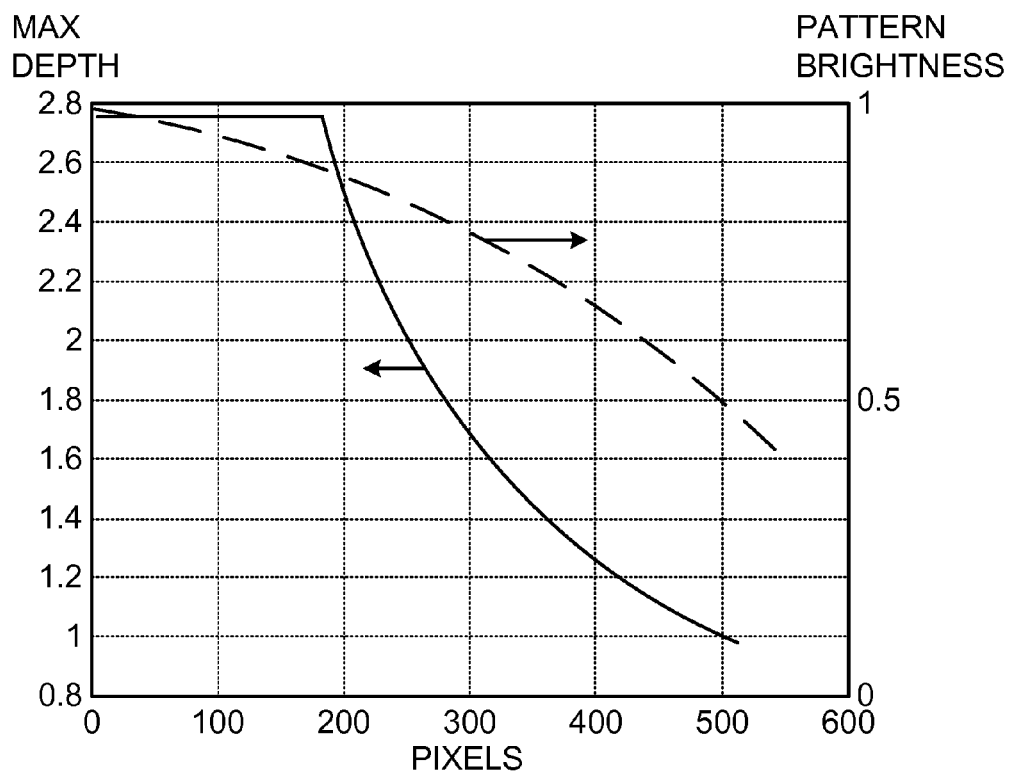
FIG. 3 is a plot that schematically shows depth and pattern brightness as a function of angle in a depth mapping system, in accordance with an embodiment of the present invention.

FIG. 3 is a plot that schematically shows depth and pattern brightness as a function of angle in a depth mapping system, in accordance with an embodiment of the present invention. The angle is expressed in terms of pixels from the center of the field of view of image capture module 34, wherein the image captured by module 34 is roughly 1000 pixels wide, and pixel 0 corresponds to the central pixel in the image. The solid curve in the plot represents the maximal depth as a function of angle within a typical volume of interest, as marked on the left side of the plot. The depth values are normalized to the depth at the angular extremes of the field of view. The dashed curve indicates pattern brightness, normalized to the maximal brightness at the center of the field, as marked on the right side of the plot.

In an active depth mapping system, the brightness of radiation that reaches an object at distance d from illumination module 30 and is then reflected back and received by image capture module 34 drops in proportion to $d^4$. Because the image area captured by each detector element in image sensor 44 grows as $d^2$, however, the optical power received by the detector elements from an object at distance d is inversely proportional to $d^2$. At any given angle, the required illumination intensity of the pattern projected by module 30 to provide a given minimum optical signal level at image sensor 44 is determined by the maximum depth of the volume of interest at that angle, as illustrated by the solid curve in FIG. 3. Thus, less projected intensity is required at high angles, where the maximum depth is smaller.

For this reason, the intensity distribution of illumination module 30 may be modulated so as to concentrate more optical radiation energy in the center of the volume of interest, at low angles, and less at higher angles, as illustrated by the dashed curve in FIG. 3. Although this curve shows only moderate modulation (to 50% of the central value at the edges of the volume), in alternative embodiments the modulation of intensity may be in proportion to the square of the maximum depth as a function of angle, in accordance with the $d^{-2}$ relation described above. The modulation of intensity may be accomplished by suitable design of radiation source 38 and/or by addition of diffractive or refractive optical elements with non-uniform energy distribution characteristics in projection optics 40.

Figure 4:
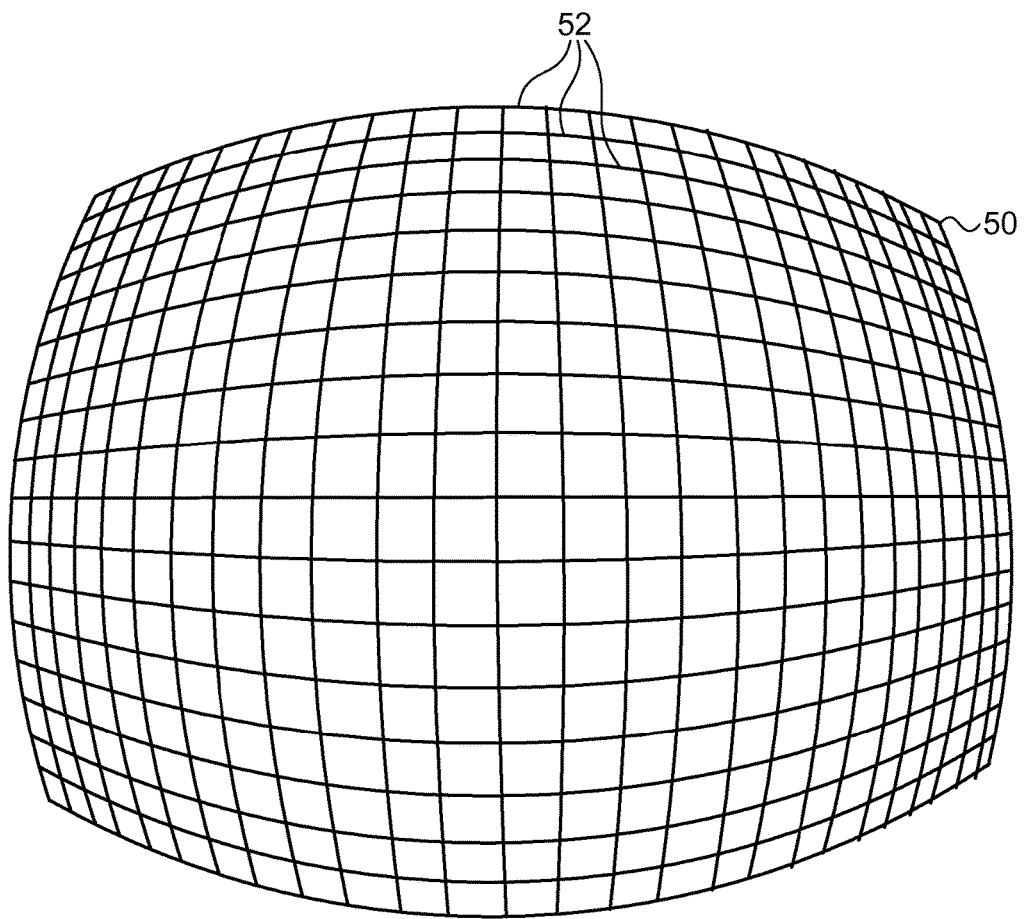
FIG. 4 is a schematic, graphical representation of an image formed by a distorting lens, in accordance with an embodiment of the present invention.

FIG. 4 is a schematic, graphical representation of an image 50 formed by a distorting lens, which may be incorporated in objective optics 42 of image capture module 34, in accordance with another embodiment of the present invention. Each cell 52 in image 50 corresponds to an area of VOI 46 captured by optics 42. Thus, pixels at the center of the field of view of module 34 receive the highest magnification, and the magnification drops with angle with increasing angle. In other words, the image is intentionally distorted, in a manner similar to that provided by fish-eye lenses. This distortion compensates for the smaller apparent sizes of objects appearing at greater distances from image capture module 34. As a result of this intentional distortion, objects of a given physical size in different locations at the outer limits of the volume of interest are imaged onto roughly equal areas of image sensor 44, thus making more effective use of the detection resources of imaging assembly 22.

Although image 50 shows a characteristic fish-eye type of distortion, optics 42 may alternatively be designed, using methods of optical design that are known in the art, to give a distortion that is more precisely tailored to the maximum distance as a function of angle (as shown in FIG. 3, for example). The distortion may be circularly symmetrical, as shown in FIG. 4, or it may alternatively be astigmatic or otherwise non-symmetrical.

The sort of optical distortion that is introduced by objective optics 42 in the embodiment illustrated by FIG. 4 can be useful in compensating for pattern distortion that may be generated by illumination module 30 in some embodiments. Such pattern distortion may arise, for example, when radiation source 38 comprises a coherent emitter, such as a laser diode, which transilluminates a diffractive optical element (DOE) to create a spot pattern. The DOE may comprise multiple diffractive surfaces, either on opposing sides of the same transparent substrate or on two or more substrates (not shown), which are stacked to create a compound DOE. DOEs of this sort are described, for example, in U.S. Patent Application Publications 2009/0185274 and 2010/0284082, whose disclosures are incorporated herein by reference.

In some of the embodiments that are described in these publications, a compound DOE comprises one DOE that applies a pattern to the input beam and another DOE that splits the input beam into a matrix of output beams so as to tile a region in space with multiple adjacent instances of the pattern. Such DOEs typically create pincushion distortion in the projected pattern, due to the fact that the diffraction orders are evenly spaced in terms of the sine of their diffraction angles, so that the angular distance between the projected orders grows with the order number. Furthermore, give the form of VOI 46, it is desirable that illumination module 30 vary the density of the pattern such that the density at a given projection angle is positively correlated with the farthest distance in the VOI at that angle. This criterion for optical resource allocation applies not only to DOE-based projectors, but also to other pattern projectors.

Objective optics 42 in the embodiment of FIG. 4 may be designed to mitigate the problems cause by the projection module, by applying an optical distortion to the image that compensates at least partially for the pattern distortion. For this purpose, optics 42 may comprise an F-theta lens, for example, which images the pattern created by the DOE in such a way that the sizes and angular separation of the spots in the images cast by the optics onto image sensor 44 remain approximately constant over the X-Y plane. The barrel distortion of the F-theta lens may be optimized to balance the pattern distortion that is caused by the DOE in illumination module 30. The properties of the F-theta lens in module 34 thus lead to enhanced depth accuracy and better transverse resolution in the center of VOI 46, at the possible expense of the high-angle, shorter-distance edge of the VOI.

Although the above embodiments present a number of specific ways in which the shape of the volume of interest can be used in enhancing the design and operation of system 20, other techniques for non-uniform resource allocation based on the shape of the volume of interest will be apparent to persons of skill in the art after reading the above description and are considered to be within the scope of the present invention. For example, pattern-based depth mapping systems sometimes suffer from problems of "phase wrapping," as pattern shifts repeat themselves periodically with increasing depth, and computational resources must be invested in "unwrapping" the phase in order to disambiguate depth values. The known maximal depth of the volume of interest as a function of angle can be used to eliminate depth values that are out of range and thus simplify the task of disambiguation.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for depth mapping, comprising:
   providing depth mapping resources comprising:
      a radiation source, which is configured to project optical radiation into a volume of interest containing an object; and
      a sensor, which is configured to sense the optical radiation reflected from the object,
      wherein the volume of interest has a variable depth relative to the sensor; and
   generating a depth map of the object using the resources while applying at least one of the resources variably over the volume of interest, responsively to the varying depth of the volume of interest.

2. The method according to claim 1, wherein the volume of interest has a pentagonal profile, with a vertex at the sensor.

3. The method according to claim 1, wherein applying the at least one of the resources variably comprises angularly modulating an intensity distribution of the optical radiation projected by the radiation source, such that the intensity varies with the varying depth of the volume of interest.

4. The method according to claim 1, wherein applying the at least one of the resources variably comprises optically distorting an image of the object that is captured by the sensor.

5. The method according to claim 1, wherein the radiation source is configured to project a spatial pattern of the optical radiation onto the object, and wherein generating the depth map comprises deriving depth coordinates of the object based on transverse shifts of the spatial pattern in the optical radiation sensed by the sensor.

6. The method according to claim 1, wherein the radiation source projects the optical radiation with a given projection distortion, and wherein the depth mapping resources comprise objective optics configured to focus the reflected optical radiation onto the sensor while applying an optical distortion that compensates at least partially for the projection distortion.

7. The method according to claim 6, wherein the objective optics comprise an F-theta lens.

8. The method according to claim 6, wherein the depth mapping resources comprise a diffractive optical element (DOE), and wherein the radiation source is configured to transilluminate the DOE so as to generate a spatial pattern.

9. The method according to claim 1, wherein applying the at least one of the resources variably over the volume of interest compensates for smaller apparent sizes of objects appearing at greater distances from the sensor.

10. Apparatus for depth mapping, comprising:
    depth mapping resources comprising:
       a radiation source, which is configured to project optical radiation into a volume of interest containing an object; and
       a sensor, which is configured to output a signal in response to the optical radiation reflected from the object,
       wherein the volume of interest has a variable depth relative to the sensor, and wherein at least one of the resources is applied variably over the volume of interest, responsively to the varying depth of the volume of interest; and
    a processor, which is configured to process the signal in order to generate a depth map of the object.

11. The apparatus according to claim 10, wherein the volume of interest has a pentagonal profile, with a vertex at the sensor.

12. The apparatus according to claim 10, wherein an intensity distribution of the optical radiation projected by the radiation source is angularly modulated responsively to the varying depth of the volume of interest, such that the intensity varies with the varying depth of the volume of interest.

13. The apparatus according to claim 10, wherein the depth mapping resources comprise optics configured to optically distort an image of the object that is captured by the sensor.

14. The apparatus according to claim 10, wherein the radiation source is configured to project a spatial pattern of the optical radiation onto the object, and wherein the processor is configured to derive depth coordinates of the object based on transverse shifts of the spatial pattern in the optical radiation sensed by the sensor.

15. The apparatus according to claim 10, wherein the radiation source is configured to project the optical radiation with a given projection distortion, and wherein the depth mapping resources comprise objective optics configured to focus the reflected optical radiation onto the sensor while applying an optical distortion that compensates at least partially for the projection distortion.

16. The apparatus according to claim 15, wherein the objective optics comprise an F-theta lens.

17. The apparatus according to claim 15, wherein the depth mapping resources comprise a diffractive optical element (DOE), and wherein the radiation source is configured to transilluminate the DOE so as to generate a spatial pattern.

18. The apparatus according to claim 10, wherein the at least one of the resources is applied variably over the volume of interest so as to compensate for smaller apparent sizes of objects appearing at greater distances from the sensor.

19. The method according to claim 1, wherein applying the at least one of the resources variably over the volume of interest comprises applying the radiation source variably over the volume of interest.

20. The method according to claim 1, wherein applying the at least one of the resources variably over the volume of interest comprises applying the sensor variably over the volume of interest.

* * * * *